United States Patent
Forster

(10) Patent No.: US 9,767,402 B2
(45) Date of Patent: Sep. 19, 2017

(54) SYSTEMS AND METHODS FOR READING LARGE POPULATIONS OF RFID TAGS

(71) Applicant: Avery Dennison Retail Information Services, LLC, Mentor, OH (US)

(72) Inventor: Ian James Forster, Chelmsford (GB)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 0 days.

(21) Appl. No.: 14/578,537

(22) Filed: Dec. 22, 2014

(65) Prior Publication Data

US 2016/0180123 A1 Jun. 23, 2016

(51) Int. Cl.
*H04Q 5/22* (2006.01)
*G06K 19/07* (2006.01)
*G06K 7/10* (2006.01)

(52) U.S. Cl.
CPC ..... *G06K 19/0726* (2013.01); *G06K 7/10019* (2013.01)

(58) Field of Classification Search
CPC .................................................. G06K 7/10198
See application file for complete search history.

(56) References Cited

U.S. PATENT DOCUMENTS

| | | | | |
|---|---|---|---|---|
| 9,087,282 | B1* | 7/2015 | Hyde | G06K 19/0726 |
| 2005/0150102 | A1* | 7/2005 | Bosco | G06K 7/0095 |
| | | | | 29/593 |
| 2008/0238619 | A1* | 10/2008 | Rofougaran | H04B 5/00 |
| | | | | 340/10.1 |
| 2009/0140860 | A1* | 6/2009 | Forster | G06K 19/0723 |
| | | | | 340/572.1 |
| 2009/0174592 | A1* | 7/2009 | Muellner | H04B 1/00 |
| | | | | 342/51 |
| 2015/0116088 | A1* | 4/2015 | Bellows | G06K 7/0008 |
| | | | | 340/10.1 |

* cited by examiner

*Primary Examiner* — Erin File
(74) *Attorney, Agent, or Firm* — Avery Dennison Retail Information Services, LLC

(57) ABSTRACT

Systems and methods are provided for better reading large populations of RFID tags. Such systems include an RFID reader and a plurality of RFID tags, each having an antenna and an associated RFID chip. Each chip includes an auto-tune circuit and is programmed to confirm the occurrence of a preselected condition. Upon such confirmation, the RFID chip modifies the functionality of the auto-tune circuit to reduce the effects of proximity coupling within the population. The preselected condition may be the tag being read by the RFID reader or the elapse of a preselected amount of time since a power-on-reset of the chip or some other event. The modification to the functionality of the auto-tune circuit may be the disabling of the auto-tune circuit or the changing of the impedance value of the chip or a decrease in the power supplied to the chip or some other modification.

20 Claims, 1 Drawing Sheet

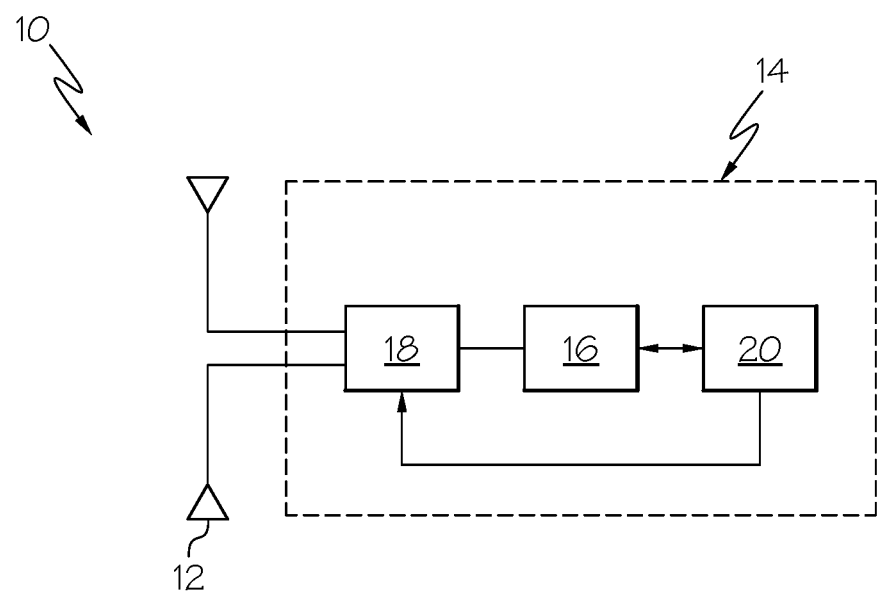

SYSTEMS AND METHODS FOR READING LARGE POPULATIONS OF RFID TAGS

BACKGROUND

Field of the Disclosure

The present subject matter relates to radio frequency identification ("RFID") devices. More particularly, the present subject matter relates to systems and methods for better reading a large population of RFID tags.

Description of Related Art

It is known to employ RFID technology to tag and identify individual pieces of merchandise. Typically, a plurality of RFID tagged items will be placed into a carton or similar container for shipment from a manufacturing or packaging facility to a retail location. Depending on the demands of the retail location, a plurality of cartons or containers may be delivered, with two or more cartons or containers shipped together on a pallet or the like.

Before the packaged items are shipped out of the manufacturing or packaging facility and/or when the packaged items arrive at the retail location, it may be advantageous to check the contents of the carton or container to ensure that the proper number of items are in the container, as well as the proper assortment of items. According to one known approach, handheld RFID scanning devices are used to catalog the contents of a carton or container.

A common protocol for reading UHF RFID tags is EPC Class 1 Generation 2, also known as ISO 18000-6C. As part of the communication protocol between an RFID reader and RFID tags, a plurality of RFID tags in a large group or population are read or scanned with an anti-collision algorithm in effect. Ideally, an RFID tag that has been read in a round of inventorying should not respond again in the same round unless specifically instructed to do so. To achieve this functionality, an RFID chip of the RFID tag may include was may be referred to as a "session flag," which has two states that may be referred to as "A" and "B." A round of inventorying may be carried out in such a way as to read all RFID tags having a session flag in the "A" state, with the RFID tags that have been read moving from the "A" state to the "B" state and not responding to the signal from the RFID reader for a given time (e.g., one second or fifteen seconds or more) to prevent them from being read a second time in a given round.

One possible difficulty when using an RFID reader or scanning device to read all of the RFID tags in a carton or container or in some other grouping is a phenomenon referred to herein as "proximity coupling." When RFID tags are closely spaced together in a large group (e.g., with a separation of 25 mm or less between adjacent RFID tags), there is a significant interaction between the various tags, especially for identically tuned tags. Exemplary effects of proximity coupling may include reduction in sensitivity at the desired operating frequency, reduction in backscattered signal, and changes in the direction of maximum sensitivity. While the above-described protocol of switching states of an internal flag is sufficient to prevent a single RFID tag from being read twice in the same round, an RFID tag not responding to a signal does not remove its impact on the performance of other RFID tags in its area (especially those tuned to the same basic frequency).

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto. In general, the present subject matter provides systems and methods whereby the effects of proximity coupling are reduced or eliminated.

In one aspect, an RFID tag includes an antenna and an RFID chip electrically connected to the antenna. The RFID chip includes an auto-tune circuit and is programmed to confirm the occurrence of a preselected condition and, upon confirming the occurrence of the preselected condition, modify the functionality of the auto-tune circuit.

In another aspect, an RFID-based method is provided for reading a plurality of RFID tags. The method involves providing a plurality of RFID tags each including an RFID chip having an auto-tune circuit. The occurrence of a preselected condition is confirmed for one of the RFID tags and, upon confirming the occurrence of the condition, the functionality of the auto-tune circuit of that RFID tag is modified.

BRIEF DESCRIPTION OF THE DRAWINGS

The FIGURE is a schematic diagram of an RFID tag according to an aspect of the present disclosure.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

According to an aspect of the present disclosure, an inventory management system or similar system is provided for reading or scanning (which terms are used interchangeably herein) a large population of RFID tags, which may include RFID tags operating on the same basic frequency or being identically tuned. The system includes an RFID reader, which may be provided according to either conventional or novel design, and a plurality of RFID tags, which may each be secured to a piece of merchandise or a merchandise tag or may be otherwise provided. Additional components may also be incorporated into the system without departing from the scope of the present disclosure.

The FIGURE illustrates an exemplary RFID tag, generally designated as 10, according to the present disclosure. The RFID tag 10 includes an antenna 12, which may be variously configured (e.g., as a di-pole antenna) and is capable of sending RFID signals to and receiving RFID signals from the RFID reader of the system. An RFID chip 14 is electrically connected to the antenna 12 and may include any of a number of components. In the illustrated embodiment, the RFID chip 14 includes what may be referred to as a "main block" 16, which carries out the basic functions of the RFID tag 10 (e.g., storing the identity of the RFID tag 10, information about a piece of merchandise associated with the RFID tag 10, and/or other data), and an associated auto-tune circuit 18 electrically coupled to the main block 16. The primary function of the auto-tune circuit 18 is changing one or more characteristics of the chip input impedance to tune the RFID tag 10 to the read frequency, thereby maximizing power coupling between the RFID chip 14 and the antenna 12. In addition to the main block 16 and the auto-tune circuit 18, the RFID chip 14 also includes an internal flag or storage location 20, which functions to confirm the occurrence of a preselected condition or event (which terms are used interchangeably herein), as will be described in greater detail herein.

In use, a plurality of RFID tags 10 in a large group or population are read or scanned by the RFID reader of the system. Upon the occurrence of the aforementioned preselected condition or event (which may be the same condition or event for each RFID tag 10 in the group or may be different for different RFID tags 10), the internal flag 20 or some other component of the RFID chip 14 of an individual RFID tag 10 interacts with the auto-tune circuit 18 to change or modify the functionality of the auto-tune circuit 18 in a way that reduces or eliminates the effects of proximity coupling within the group or population. Generally speaking, the modification to the functionality of the auto-tune circuit 18 reduces the effects of proximity coupling by preventing the modified auto-tune circuit 18 from tuning the RFID tag 10 to the read frequency and minimizing its interaction with RFID tags 10 having auto-tune circuits 18 still operating according to their normal functionality. By decreasing the effects of proximity coupling, the RFID tags 10 maintain a higher sensitivity at the desired operating frequency and higher signal backscatter, while better retaining their intended direction of maximum sensitivity. The auto-tune circuits 18 may ultimately be returned to operation according to their normal functionality (e.g., after a round of inventorying has been completed or after a preselected amount of time) or may remain in their modified state indefinitely.

The preselected condition or event may be any of a number of conditions or events. For example, the preselected condition or event may be the RFID tag 10 being read or scanned by the RFID reader of the system. In that case, the internal flag 20 may be a session flag that changes from one state to another (e.g., from an "A" state to a "B" state) when the RFID tag 10 has been read or scanned by the RFID reader. Upon the internal flag 20 so confirming that the RFID tag 10 has been read or scanned by the RFID reader, the internal flag 20 or some other component of the RFID chip 14 may interact with the auto-tune circuit 18 to change the functionality of the auto-tune circuit 18, thereby reducing the effects of proximity coupling. If all of the RFID tags 10 of a group or population to be read or scanned are so configured, then they will act to sequentially change the functionality of their respective auto-tune circuits 18 (to match the sequential reading/scanning of the RFID tags 10), such that the effects of proximity coupling are continually decreasing as the reading/scanning process continues. In other words, the effects of proximity coupling are at a maximum at the beginning of a reading/scanning process (with all of the auto-tune circuits 18 operating with their standard functionality), then the internal flag 20 of one of the RFID tags 10 confirms that the RFID tag 10 has been read/scanned by the RFID reader and the functionality of the associated auto-tune circuit 18 is changed (thereby reducing the effects of proximity coupling within the group or population) and so on, with the effects of proximity coupling within the group or population decreasing with each auto-tune circuit 18 operating with changed functionality until all of the RFID tags 10 in the group or population have been read or scanned, all of the auto-tune circuits 18 are operating with a modified functionality, and the effects of proximity coupling are at a minimum.

In another embodiment, the internal flag 20 may be a timer that compares the time that has elapsed since a power-on-reset of the RFID chip 14. The internal flag 20 compares the time elapsed to a preselected time and, once the time elapsed is equal to or greater than the preselected time, the internal flag 20 has confirmed the occurrence of the preselected condition or event (i.e., the elapse of a preselected amount of time since a power-on-reset of the RFID chip 14). Upon the internal flag 20 so confirming the elapse of the proper amount of time since a power-on-reset of the RFID chip 14, the functionality of the auto-tune circuit 18 may be changed, thereby reducing the effects of proximity coupling (as described above in greater detail).

It should be understood that the foregoing are merely two exemplary preselected conditions or events that the RFID chip 14 may be programmed to monitor, and other preselected conditions or events may be chosen without departing from the scope of the present disclosure.

Once the internal flag 20 has confirmed the occurrence of the preselected condition or event, the functionality of the auto-tune circuit 18 may be changed in one or more of any of a variety of ways. For example, the auto-tune circuit 18 may be disabled upon confirming the occurrence of the preselected condition or event. In another embodiment, the auto-tune circuit 18 may be set to change the impedance value to something other than the ideal value, such as by changing to a maximum value, a minimum value, or some randomly chosen value upon confirming the occurrence of the preselected condition or event. In another embodiment, the auto-tune circuit 18 is modified to cause the RFID chip 14 to be supplied with a decreased amount of power, such as with the minimum amount of power required to allow the RFID chip 14 to operate. In such a state, an RFID tag 10 in the proximity of the RFID reader of the system does not tune to maximum coupling, thereby reducing its interaction with other RFID tags 10 in the read field of the RFID reader. The auto-tune circuit 18 can be used to in a sense achieve a freeze effect, where the auto-tune is used to recover adequate power to the RFID chip 14 but not maximum power. In yet another embodiment, more than one modification is made to the functionality of the auto-tune circuit 18 to reduce the effects of proximity coupling.

It should be understood that the foregoing are merely exemplary of modifications that may be made to the functionality of an auto-tune circuit 18, and other modifications to decrease the effects of proximity coupling (i.e., by preventing the auto-tune circuit 18 from tuning the RFID tag 10 to the read frequency and minimizing its interaction with RFID tags 10 having auto-tune circuits 18 still operating according to their normal functionality) may be made during a read/scan procedure without departing from the scope of the present disclosure.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. An RFID tag comprising:
   an antenna; and
   an RFID chip having an internal flag such that the chip is electrically connected to the antenna, wherein the RFID chip includes an auto-tune circuit, to operate the RFID chip in a decreased power state such that the auto-tune is used to recover adequate power to the RFID chip;
   and the flag is programmed to confirm the occurrence of a preselected condition and, upon confirming the occurrence of said preselected condition, modify the functionality of the auto-tune circuit.

2. The RFID tag of claim 1, wherein said preselected condition is the RFID tag being read by an RFID reader.

3. The RFID tag of claim 2, wherein the internal flag is programmed to move from a first state to a second state when the RFID tag has been read by the RFID reader.

4. The RFID tag of claim 1, wherein
   the preselected condition is the elapse of a preselected amount of time since a power-on-reset of the RFID chip, and
   the RFID chip includes a timer programmed to determine the time elapsed since a power-on-reset of the RFID chip.

5. The RFID tag of claim 1, wherein the RFID chip is programmed to disable the auto-tune circuit upon confirming the occurrence of the preselected condition.

6. The RFID tag of claim 1, wherein the RFID chip is programmed to set the auto-tune circuit to a maximum value upon confirming the occurrence of the preselected condition.

7. The RFID tag of claim 1, wherein the RFID chip is programmed to set the auto-tune circuit to a minimum value upon confirming the occurrence of the preselected condition.

8. The RFID tag of claim 1, wherein the RFID chip is programmed to set the auto-tune circuit to a randomly chosen value upon confirming the occurrence of the preselected condition.

9. The RFID tag of claim 1, wherein the RFID chip is programmed to cause the auto-tune circuit to supply the RFID chip with a decreased amount of power upon confirming the occurrence of the preselected condition.

10. The RFID tag of claim 9, wherein the decreased amount of power comprises the minimum amount of power required to allow the RFID chip to operate.

11. An RFID-based method of reading a plurality of RFID tags, comprising:
   providing a plurality of RFID tags each including an RFID chip having an internal flag and each chip comprising an auto-tune circuit, the auto-tune circuit operates the RFID chip in a decreased power state such that the auto-tune is used to recover adequate power to the RFID chip;
   confirming the occurrence of a preselected condition for one of the RFID tags by the flag; and
   upon confirming the occurrence of the preselected condition, the flag modifies the functionality of the auto-tune circuit of said one of the RFID tags.

12. The method of claim 11, wherein said preselected condition is said one of the RFID tags being read by an RFID reader.

13. The method of claim 12, wherein said confirming the occurrence of a preselected condition includes moving the internal flag of said one of the RFID tags from a first state to a second state when said one of the RFID tags has been read by the RFID reader.

14. The method of claim 11, wherein the preselected condition is the elapse of a preselected amount of time since a power-on-reset of the RFID chip of said one of the RFID tags.

15. The method of claim 11, wherein said modifying the functionality of the auto-tune circuit includes disabling the auto-tune circuit of said one of the RFID tags.

16. The method of claim 11, wherein said modifying the functionality of the auto-tune circuit includes setting the auto-tune circuit of said one of the RFID tags to a maximum value.

17. The method of claim 11, wherein said modifying the functionality of the auto-tune circuit includes setting the auto-tune circuit of said one of the RFID tags to a minimum value.

18. The method of claim 11, wherein said modifying the functionality of the auto-tune circuit includes setting the auto-tune circuit of said one of the RFID tags to a randomly chosen value.

19. The method of claim 11, wherein said modifying the functionality of the auto-tune circuit includes causing the auto-tune circuit of said one of the RFID tags to supply the RFID chip of said one of the RFID tags with a decreased amount of power.

20. The method of claim 19, wherein the decreased amount of power comprises the minimum amount of power required to allow the RFID chip of said one of the RFID tags to operate.

* * * * *